US012145721B2

(12) United States Patent
Cravener et al.

(10) Patent No.: US 12,145,721 B2
(45) Date of Patent: Nov. 19, 2024

(54) ANISOTROPIC MAGNETO-RESISTIVE SENSOR FLAP MEASURING SYSTEMS

(71) Applicant: Bell Textron Inc., Fort Worth, TX (US)

(72) Inventors: Kyle Thomas Cravener, Arlington, TX (US); Patrick Smith, Fort Worth, TX (US); Troy Cyril Schank, Keller, TX (US); Brady Garrett Atkins, Euless, TX (US); Kynn Jerald Schulte, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 156 days.

(21) Appl. No.: 17/555,024

(22) Filed: Dec. 17, 2021

(65) Prior Publication Data

US 2023/0192276 A1    Jun. 22, 2023

(51) Int. Cl.
*B64C 27/00* (2006.01)
*B64C 27/35* (2006.01)
*G01D 5/14* (2006.01)

(52) U.S. Cl.
CPC ........... *B64C 27/008* (2013.01); *B64C 27/35* (2013.01); *G01D 5/145* (2013.01)

(58) Field of Classification Search
CPC ...... B64C 27/008; B64C 27/35; G01D 5/145; G01R 33/09; G01R 33/096
USPC ............................................................ 416/3
See application file for complete search history.

(56) References Cited

U.S. PATENT DOCUMENTS

| 5,011,373 | A | * | 4/1991 | Aubry | B64C 27/72 416/115 |
| 5,749,540 | A | * | 5/1998 | Arlton | B64C 27/82 244/17.19 |
| 6,616,095 | B2 | * | 9/2003 | Stamps | B64C 27/37 416/114 |
| 8,004,277 | B2 | * | 8/2011 | Patil | B62D 15/0245 324/207.25 |
| 8,070,090 | B2 | * | 12/2011 | Tayman | B64C 39/024 244/6 |
| 8,955,792 | B2 | | 2/2015 | Schank | |
| 9,605,978 | B2 | * | 3/2017 | Ausserlechner | G01D 5/145 |
| 9,657,582 | B2 | | 5/2017 | Haldeman et al. | |
| 9,809,303 | B2 | * | 11/2017 | Schank | B64C 27/35 |
| 10,011,367 | B2 | * | 7/2018 | Dillon | B64F 5/60 |
| 10,384,771 | B2 | | 8/2019 | Haldeman et al. | |

(Continued)

OTHER PUBLICATIONS

Cravener, Kyle Thomas et al., "Anisotropic Magneto-Resistive Sensor Flap-Measuring Systems", U.S. Appl. No. 17/555,104, filed Dec. 17, 2021, 46 pages.

(Continued)

*Primary Examiner* — Woody A Lee, Jr.
*Assistant Examiner* — Justin A Pruitt
(74) *Attorney, Agent, or Firm* — Bradley Arant Boult Cummings LLP

(57) ABSTRACT

A rotor-hub flap-measurement system includes a rotor hub operable to flap relative to a main-rotor axis, a flap-linkage arm, a first end of the flap-linkage arm rotatably coupled to the rotor hub, the flap-linkage arm responsive to flapping of the rotor hub, and a magneto-resistive sensor system rotatably coupled to a second end of the flap-linkage arm and responsive to movement of the flap-linkage arm.

20 Claims, 8 Drawing Sheets

(56) References Cited

U.S. PATENT DOCUMENTS

| | | |
|---|---|---|
| 10,577,096 B2 | 3/2020 | Roberts et al. |
| 10,829,242 B2 * | 11/2020 | Cravener ............... B64D 45/00 |
| 10,960,969 B2 | 3/2021 | Choi et al. |
| 11,136,116 B2 | 10/2021 | Maresh et al. |
| 2009/0278638 A1 * | 11/2009 | Giroud .................. H01H 19/11 335/205 |
| 2012/0053851 A1 | 3/2012 | Baller et al. |
| 2013/0092786 A1 | 4/2013 | Kellner |
| 2013/0243597 A1 | 9/2013 | Perrin et al. |
| 2014/0145025 A1 | 5/2014 | Fang et al. |
| 2014/0271188 A1 | 9/2014 | Dillon |
| 2015/0069175 A1 | 3/2015 | Schank |
| 2015/0210382 A1 | 7/2015 | Dempsey et al. |
| 2016/0224030 A1 | 8/2016 | Wulff et al. |
| 2016/0258781 A1 | 9/2016 | Ausserlechner et al. |
| 2017/0203838 A1 | 7/2017 | Thomas et al. |
| 2018/0155015 A1 | 6/2018 | Thompson et al. |
| 2021/0179263 A1 | 6/2021 | Sayyah et al. |
| 2021/0269148 A1 | 9/2021 | Cravener |
| 2021/0291960 A1 | 9/2021 | Maresh et al. |

OTHER PUBLICATIONS

Cravener, Kyle Thomas, "Anistropic Magneto-Resistive Sensor Flap-Measuring on Gimballed Hub", U.S. Appl. No. 18/115,213, filed Feb. 28, 2023, 56 pages.

Cravener, Kyle Thomas, "Universal-Joint Rotor-Hub Method and System", U.S. Appl. No. 18/115,220, filed Feb. 28, 2023, 58 pages.

* cited by examiner

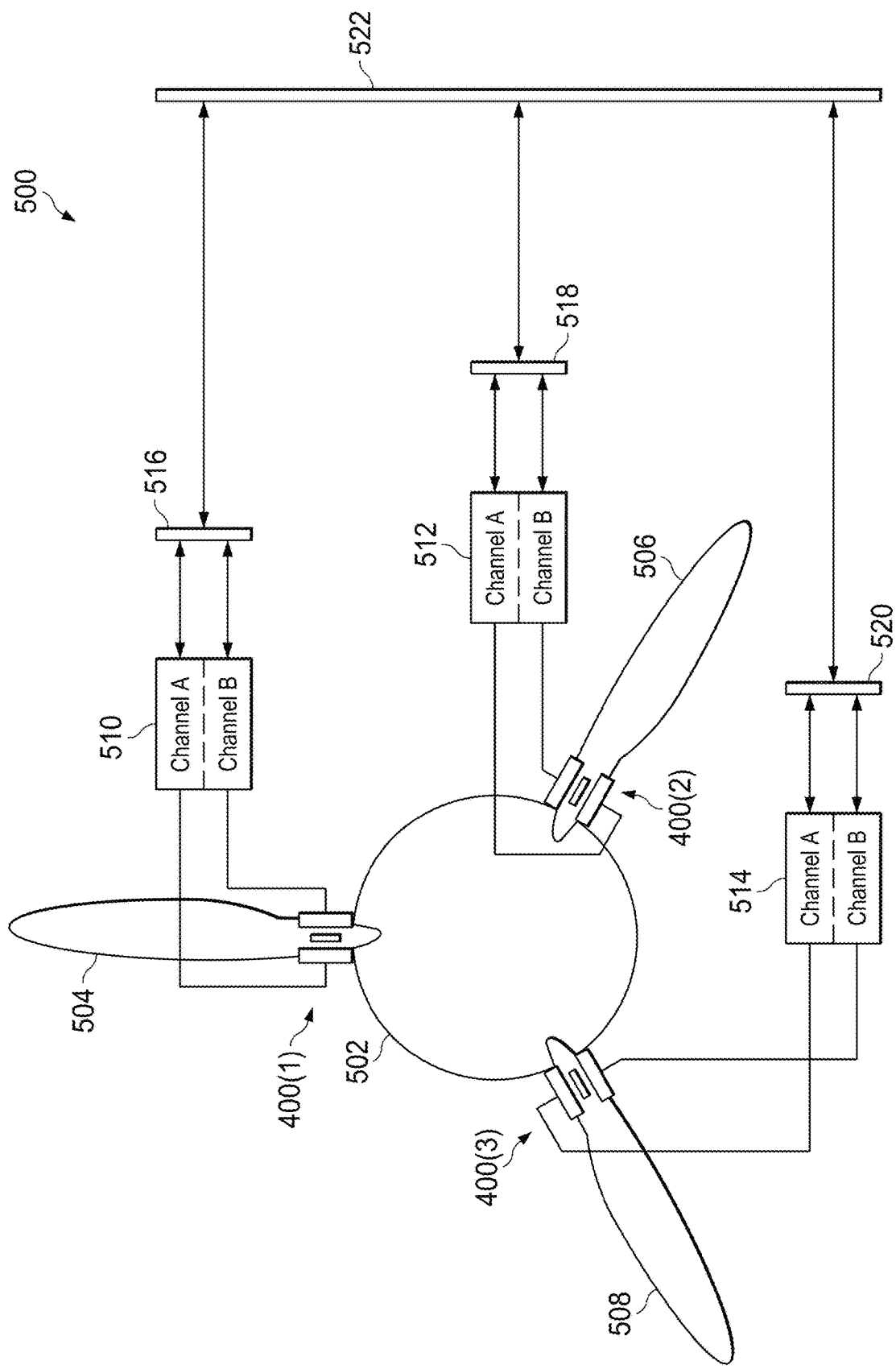

ANISOTROPIC MAGNETO-RESISTIVE SENSOR FLAP MEASURING SYSTEMS

TECHNICAL FIELD

The present disclosure relates generally to systems and methods for measuring rotor-hub flapping in vertical takeoff and landing ("VTOL") rotary aircraft and more particularly, but not by way of limitation, to systems and methods employing anisotropic magneto-resistive ("AMR") sensors.

BACKGROUND

This section provides background information to facilitate a better understanding of the various aspects of the disclosure. It should be understood that the statements in this section of this document are to be read in this light, and not as admissions of prior art.

Rotor-hub flapping-measurement systems have used rotary-variable-differential transducer ("RVDT") sensors. However, such systems have a number of drawbacks, including size, weight, cost, complexity of electronics, and sensitivity to temperature and mechanical vibration.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A rotor-hub flap-measurement system includes a rotor hub operable to flap relative to a main-rotor axis, a flap-linkage arm, a first end of the flap-linkage arm rotatably coupled to the rotor hub, the flap-linkage arm responsive to flapping of the rotor hub, and a magneto-resistive sensor system rotatably coupled to a second end of the flap-linkage arm and responsive to movement of the flap-linkage arm.

A rotor-hub flap-measurement method includes flapping, by a rotor hub, relative to a main-rotor axis, responsive to the flapping, a first end of a flap-linkage arm rotatably coupled to the rotor hub moving, at least in part, parallel to the main-rotor axis, and responsive to the moving by the flap-linkage arm, a magneto-resistive sensor system rotatably coupled to a second end of the flap-linkage arm sensing movement of the flap-linkage arm.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 5 illustrates a sensor system that utilizes multiple sensor arrangements;

DETAILED DESCRIPTION

Various embodiments will now be described more fully with reference to the accompanying drawings. The disclosure may, however, be embodied in many different forms and should not be construed as limited to the embodiments set forth herein.

Figure 1:
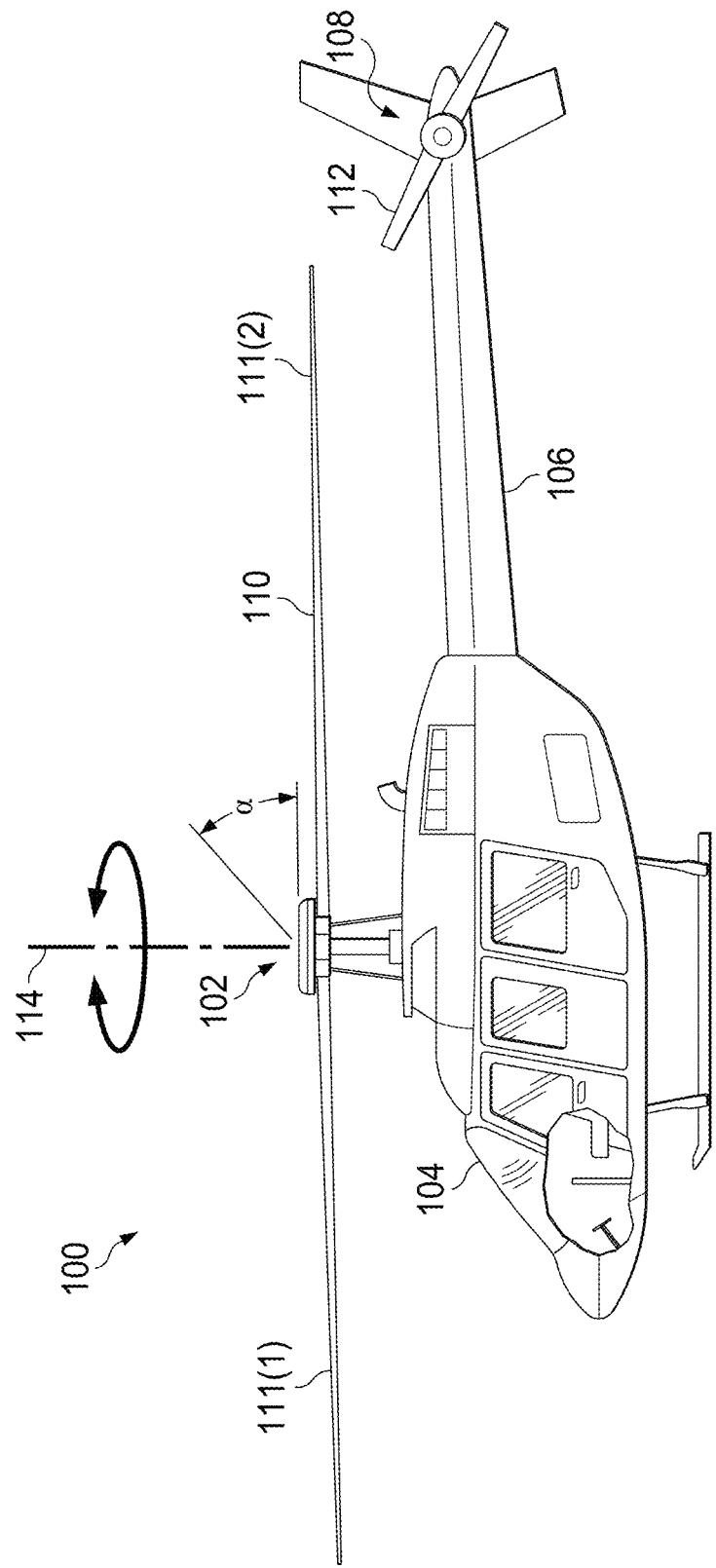
FIG. 1 is an illustrative vertical takeoff and landing ("VTOL") rotary aircraft.

FIG. 1 is an illustrative vertical takeoff and landing ("VTOL") rotary aircraft 100. The rotary aircraft 100 includes a rotor system 102, a fuselage 104, and a tail boom 106. The tail boom 106 carries an anti-torque system 108. The rotor system 102 includes a teetering rotor hub and a main rotor 110 that includes a plurality of rotor blades for creating flight, a rotor blade 111(1) and a rotor blade 111(2) being shown in FIG. 1, although a different number of rotor blades could be used other than two as illustrated. The rotor system 102 may include a control system for selectively controlling pitch of each of the plurality of rotor blades 111(1) and 111(2) of the main rotor 110 to control direction, thrust, and lift of the rotary aircraft 100. The anti-torque system 108 includes a tail rotor 112. The tail rotor 112 provides thrust to counter torque due to rotation of the main rotor 110 about a main-rotor axis 114. The teetering rotor hub has a discrete hinge in line with the main-rotor axis 114. The teetering rotor hub and the rotor blades 111(1) and 111(2) are shown as perpendicular to the main-rotor axis 114, at which orientation relative to the main rotor 110 a rotor-hub-flapping angle $\alpha=0°$.

Figure 2:
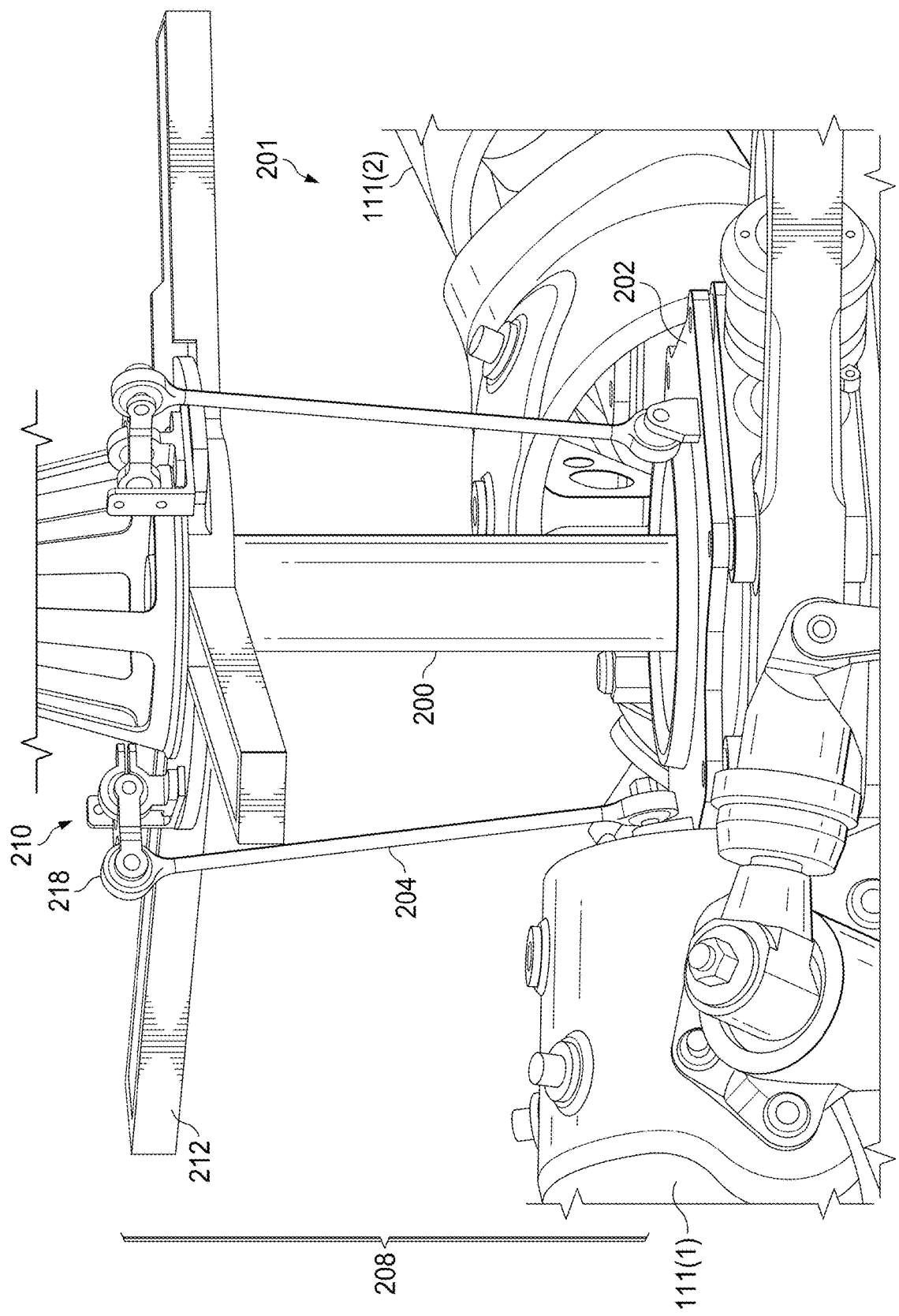
FIG. 2 shows the rotor system of FIG. 1 in more detail according to one illustrative embodiment.

FIG. 2 shows a rotor system 201 of FIG. 1 in detail according to one illustrative embodiment. In the example of FIG. 2, the rotor system 201 includes a rotor mast 200 and a rotor hub 202. In contrast to the teetering rotor hub of FIG. 1, the rotor hub 202 is a gimballed rotor hub. The rotor hub 202 couples the rotor blades 111(1) and 111(2) of the main rotor 110 to the rotor mast 200, the rotor blades 111(1) and 111(2) being shown only in part. In some examples, the rotor system 201 may include more or fewer components, not all of which are necessarily shown or are shown but not labeled with a reference numeral in FIG. 2 for purposes of clarity.

The rotor mast 200 and the rotor hub 202 are examples of mechanical components that generate and transmit torque and rotation. A power train of which the rotor mast 200 and the rotor hub 202 are a part may include a variety of components, such as, for example, an engine, a transmission, and differentials. The rotor blades 111(1) and 111(2) are coupled to the rotor hub 202 such that rotation of the rotor hub 202 causes the rotor blades 111(1) and 111(2) to rotate about the rotor mast 200.

The rotor blades 111(1) and 111(2) may be subject to a variety of different forces. For example, rotation of the rotor blades 111(1) and 111(2) may result in a centrifugal ("CF") force against the rotor blades 111(1) and 111(2) in a direction away from the rotor mast 200. In addition, weight of the rotor blades 111(1) and 111(2) may result in a transverse force being applied against the rotor hub 202. These and other forces may cause the rotor blades 111(1) and 111(2) to feather, drag (i.e, lead/lag), and flap during flight of the rotary aircraft 100.

The term rotor-hub flapping generally refers to motion of a rotor hub that has a discrete hinge in line with a rotor-mast axis (e.g., main-rotor axis 114) during operation such that $\alpha \ne 0°$. Such rotor hub designs are commonly used in gimballed rotor hubs and teetering rotor hubs. In the example of FIG. 2, the rotor hub 202 is shown at a substantially zero-degree rotor-hub flapping angle in which α is slightly offset from zero, zero degrees being 900 from the main-rotor axis 114. When rotor-hub flapping occurs, the rotor blades 111(1) and 111(2) deviate upward or downward.

The rotor system 201 includes a hub-flap measurement system 208. The hub-flap measurement system 208 measures flapping of the rotor hub 202 such that the rotor hub 202 is not perpendicular to the main-rotor axis 114. It will be appreciated that when the rotor hub 202 is not perpendicular to the main-rotor axis 114, an amount of hub flap will be different at different azimuthal positions of the rotor hub 202. The hub-flap measurement system 208 may be used to estimate flapping of the rotor blade 111(2) at a given azimuthal position by measuring flapping of the rotor hub 202, since the majority of rotor-blade flapping typically is the result of rotor-hub flapping. Although the hub-flap measurement system 208 is illustrated as aligned azimuthally with the blade 111(2), this need not necessarily be the case, since any suitable number of hub-flap measurement systems 208 may be arranged around a circumference of the rotor hub 202 as desired in a given implementation. The hub-flap measurement system 208 includes a flap-linkage arm 204, an anisotropic magneto-resistive ("AMR") sensor system 210, and a platform 212. The flap linkage couples the rotor hub 202 to the AMR sensor system 210, as described in more detail below.

The AMR sensor system 210 utilizes an AMR sensor. An AMR sensor has a function where resistance decreases when a magnetic field is applied and in which the function is dependent on a direction of magnetic force lines applied to the sensor. AMR sensors measure flux angle and not magnitude and can operate in a saturated condition, such that they are less susceptible to external influences and have increased sensitivity with decreased variation in measurement in comparison to rotary-variable differential-transformer ("RVDT") based systems. Many AMR sensors are programmable, which facilitates their use in a wide variety of applications. For purposes of this application, the term angle sensors includes both AMR sensors and giant magneto-resistive ("GMR") sensors, either of which may be used in systems and methods discussed herein. Outputs of many angle sensors may be analog or digital.

The platform 212, shown for example integrated into spinner-spoke mounts, supports the AMR sensor system 210 and couples the AMR sensor system 210 to the rotor mast 200. In the example of FIG. 2, the flap-linkage arm 204 is coupled to the AMR sensor system 210 and to the rotor hub 202, respectively, via a spherical bearing 216 and a spherical bearing 218. During operation, in an illustrative embodiment, flapping of the rotor hub 202 causes the flap-linkage arm 204 to move, which movement is translated to the AMR sensor system 210 via the spherical bearing 218 so the AMR sensor system 210 may use an AMR sensor, discussed in more detail below, contained therein to measure an amount of flapping of the rotor hub 202. The AMR sensor system 210 is configured, in a typical embodiment, to rotate with the rotor mast 200 during operation. The hub-flap measurement system 208 does not directly measure flapping of the rotor blade 111(1); rather, the hub-flap measurement system 208 measures movement of the rotor hub 202 at the spherical bearing 216 and, based thereon, estimates flapping of the rotor blade 111(1) based on movement of the rotor hub 202 at the spherical bearing 216. A second hub-flap measurement system (unnumbered) is shown in FIG. 2. It will be appreciated that the second hub-flap measurement system is analogous to the hub-flap measurement system 208 and that, in a typical embodiment, a hub-flap measurement system is associated with each rotor blade 111(1)-111(n) of a given VTOL rotary aircraft.

Measurements provided by the hub-flap measurement system 208 alone may be of limited value. For example, the hub-flap measurement system 208 does not itself include mechanisms for correlating measurements with rotor-blade azimuthal rotational positions. Therefore, even if the hub-flap measurement system 208 accurately measures rotor-hub flapping angles, for example, the hub-flap measurement system 208 alone is not able to calculate at which points of a 360° rotational azimuth of the main rotor 110 given measurements occur.

Figure 3:
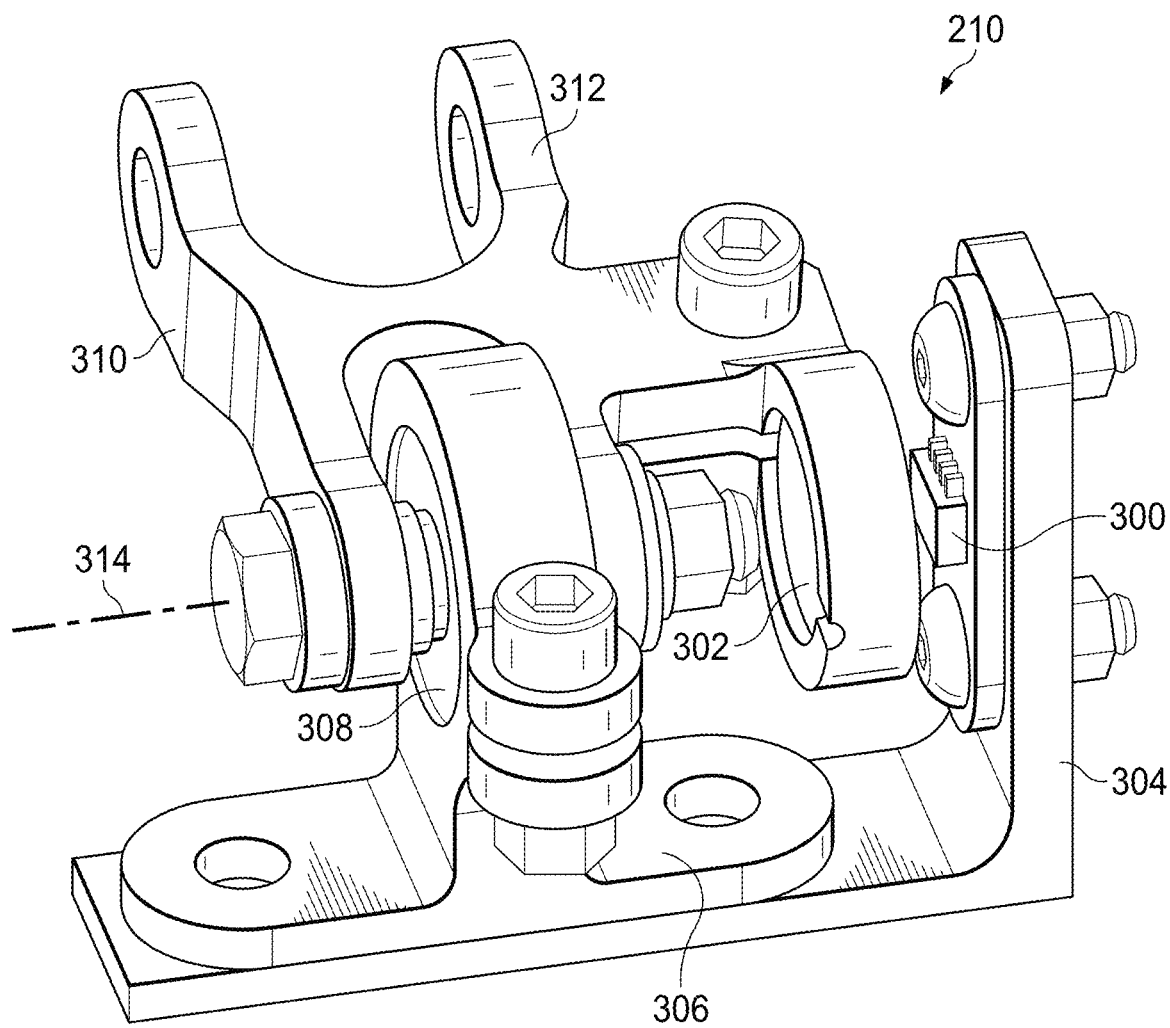
FIG. 3 illustrates an AMR sensor system in detail.

FIG. 3 illustrates the AMR sensor system 210 in more detail. As shown in FIG. 3, the AMR sensor system 210 includes an AMR sensor 300, a magnet 302, a mounting bracket 304 (shown as an L bracket), a bearing housing 306, a bearing 308 housed by the bearing housing 306, and a sensor arm 310. The magnet 302 may be, for example, a Neodymium magnet or a Cobalt magnet. In a typical embodiment, the magnet 302 is diametrically magnetized. In the embodiment shown, the AMR sensor 300 is mounted to the mounting bracket 304 and the magnet 302 is mounted to the sensor arm 310; however, the AMR sensor 300 could be mounted to the sensor arm 310 and the magnet 302 mounted to the mounting bracket 304 without departing from principles disclosed herein. The bearing 308, which is mounted within the bearing housing 306, is typically a ball bearing, although other suitable types of bearings such as a needle-roller bearing or a TEFLON bearing may be used.

The magnet 302 and the AMR sensor 300 are positioned so as to be near one another in order that the AMR sensor 300 can detect relative rotation between the AMR sensor and the magnet 302. The sensor arm 310 includes a spherical-bearing mounting section 312, to which the flap-linkage arm 204 is connected via the spherical bearing 218. Flapping of the rotor hub 202 causes the flap-linkage arm 204 to move up or down in response thereto. As the flap-linkage arm 204 moves, the spherical-bearing mounting section 312 and the magnet 302 are caused to rotate about a rotational axis 314 of the bearing 308. The AMR sensor 300 mounted adjacent to the magnet 302 is able to measure an amount of the rotation of the magnet 302 about the rotational axis 314.

Even though AMR sensors have a number of advantages relative to RVDT sensors, many AMR sensors do not have the robust in-line monitoring capabilities of RVDT sensors; therefore, several AMR-sensor-based architectures are outlined below that can be utilized to identify erroneous AMR sensing. In typical embodiments, full-channel independence of both power and signal are implemented and concepts can be applied to federated or distributed architectures.

Figure 4A:
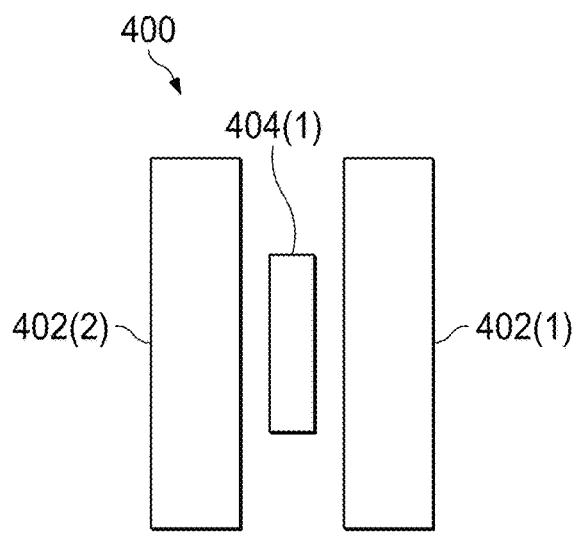
FIGS. 4A-C show sensor arrangements that employ the AMR sensor.
Figure 4B:
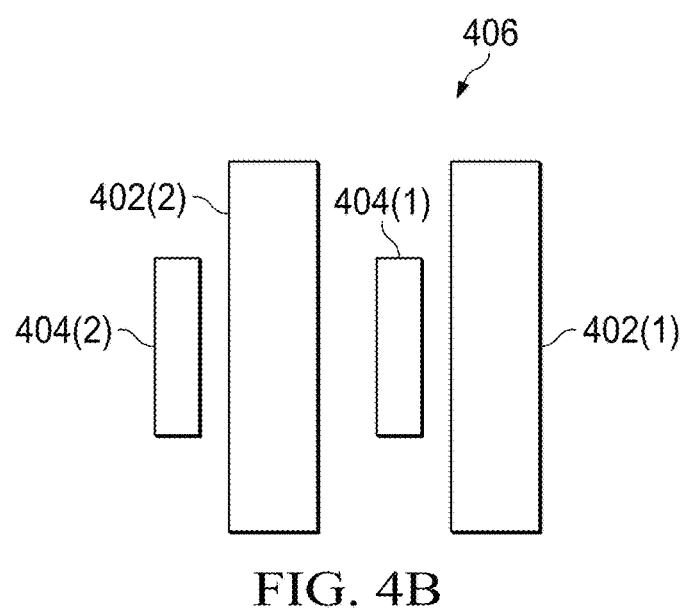
Figure 4C:
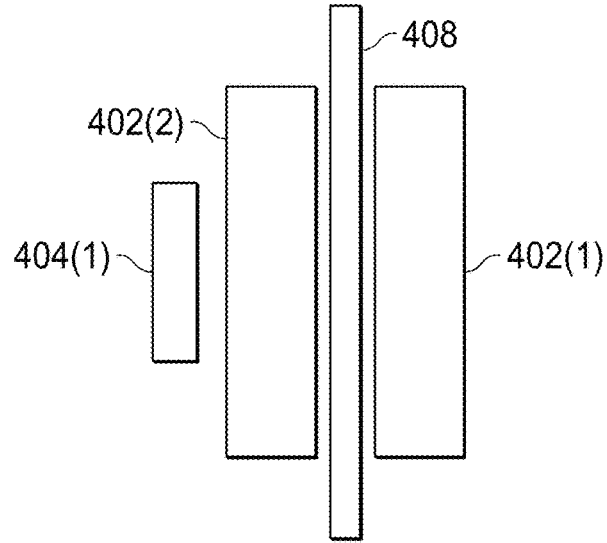

FIGS. 4A-4C illustrate different configurations in which multiple AMR sensors and magnets are utilized in order to identify erroneous AMR sensing. Any of the configurations can be employed in embodiments of an AMR sensor system similar to the AMR sensor system 210.

FIG. 4A shows a sensor arrangement 400 that includes an AMR sensor 402(1) and an AMR sensor 402(2) on either side of a magnet 404(1). As noted above, either the magnet 404(1) or the AMR sensors 402(1) and 402(2) could rotate with the other being held stationary. It will be appreciated that, in the sensor arrangement 400, each of the AMR sensors 402(1) and 402(2) senses relative rotation with respect to the magnet 404(1) and, in the event of a failure of one of the AMR sensors 402(1) or 402(2), sensing of relative rotation could still be accomplished.

FIG. 4B shows a sensor arrangement 406 that includes the AMR sensors 402(1) and 402(2) as well as the magnet 404(1) and a magnet 404(2). The magnets 404(1) and 404(2) are each paired with a respective one of the AMR sensors 402(1) and 402(2), such that two independent magnet-AMR-sensor pairs that are sufficiently magnetically distant from one another are utilized to reduce the chance of a common mode failure, especially in situations in which a common mode could validate a measurement in a given architecture.

FIG. 4C shows a sensor arrangement 410 that includes the AMR sensors 402(1) and 402(2) as well as the magnet 404(1) and an intermediate circuit board 408, on either side of which are mounted the AMR sensors 402(1) and 402(2). In the sensor arrangement 410, each of the AMR sensors 402(1) and 402(2) is able to sense relative rotation of the magnet 404(1).

FIG. 5 illustrates a sensor system that utilizes multiple sensor arrangements 400. A sensor system 500 includes a hub 502 and a rotor blade 504, a rotor blade 506, and a rotor blade 508 extending from the hub 502. The hub 502 has three sensor arrangements 400(1), 400(2), and 400(3) associated therewith, each of which is aligned azimuthally with one of the rotor blades 504, 506, and 508, respectively. The sensor system 500 may be referred to as a dual triplex architecture. As noted above, the sensor arrangements 400 (1)-(3) need not necessarily be so aligned.

Each of the sensor arrangements 400(1), 400(2), and 400(3) includes a pair of AMR sensors and a magnet. Each of the AMR sensors is inter-operably coupled to a respective channel of a flight control computer ("FCC"), FCC 510, FCC 512, and FCC 514 being associated with sensor arrangements 400(1), 400(2), and 400(3), respectively. Each of the FCC 510, 512, and 514 has a channel A and a channel B inter-operably coupled to a given AMR sensor, each of which channels is output to respective data buses 516, 518, and 520. Data buses 516, 518, and 520 are each inter-operably coupled to a cross channel datalink ("CCDL") 522.

Each of the FCC 510, FCC 512, and FCC 514 can identify erroneous sensing by its associated sensor arrangement 400(1), 400(2), and 400(3) by comparing measurement across channels A and B or comparing flapping solutions across channels. In a typical embodiment, a mis-compare by one of the FCC 510, FCC 512, and FCC 514 between channels A and B identifies a solution as invalid. In some embodiments, even if a mis-compare occurs, the sensor system 500 can continue to operate in spite of the mis-compare based on valid measurements of one or more of the remaining FCCs.

Figure 6:
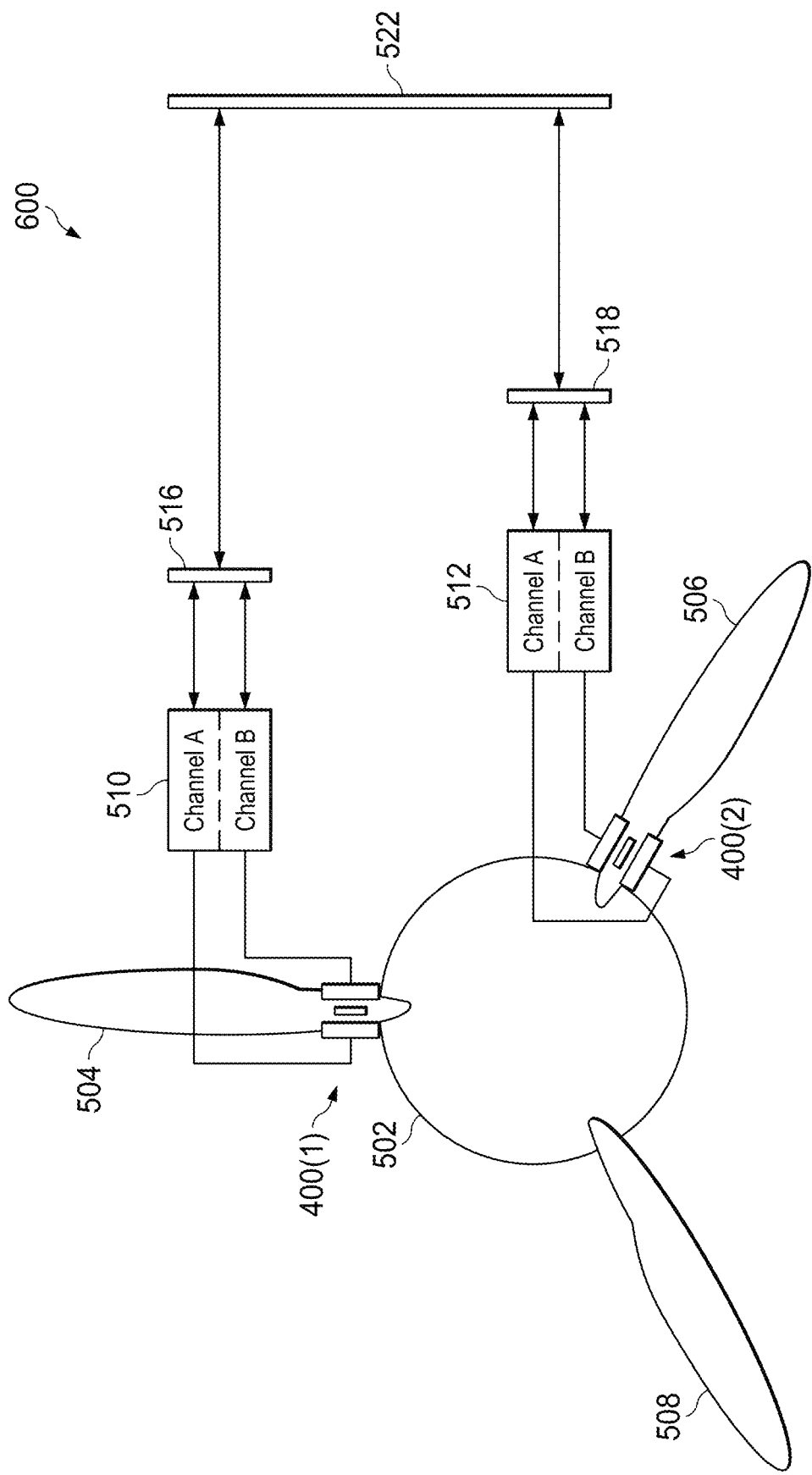
FIG. 6 illustrates a sensor system that utilizes multiple sensor arrangements.

FIG. 6 illustrates a sensor system that utilizes multiple sensor arrangements 400. A sensor system 600 includes the hub 502 the rotor blade 504, the rotor blade 506, and the rotor blade 508 extending from the hub 502. The hub 502 has two sensor arrangements 400(1) and 400(2) associated therewith, each of which is aligned azimuthally with one of the rotor blades 504 and 506, respectively. The sensor system 600 may be referred to as a dual duplex architecture. As noted above, the sensor arrangements 400(1)-(2) need not necessarily be so aligned.

Each of the sensor arrangements 400(1) and 400(2) includes a pair of AMR sensors and a magnet. Each of the AMR sensors is inter-operably coupled to a respective channel of a flight control computer ("FCC"), FCC 510 and FCC 512 being associated with the sensor arrangements 400(1) and 400(2), respectively. Each of the FCC 510 and 512 has a channel A and a channel B inter-operably coupled to a given AMR sensor, each of which channels is output to respective data buses 516 and 518. Data buses 516 and 518 are each inter-operably coupled to the cross channel datalink ("CCDL") 522.

Each of the FCC 510 and the FCC 512 can identify erroneous sensing by its associated sensor arrangement 400(1) and 400(3) by comparing measurement across channels A and B or comparing flapping solutions across channels. In a typical embodiment, In a typical embodiment, a mis-compare by one of the FCC 510 and FCC 512 between channels A and B identifies a solution as invalid. In some embodiments, even if a mis-compare occurs, the sensor system 600 can continue to operate in spite of the mis-compare based on valid measurements of one or more of the remaining FCCs.

Figure 7:
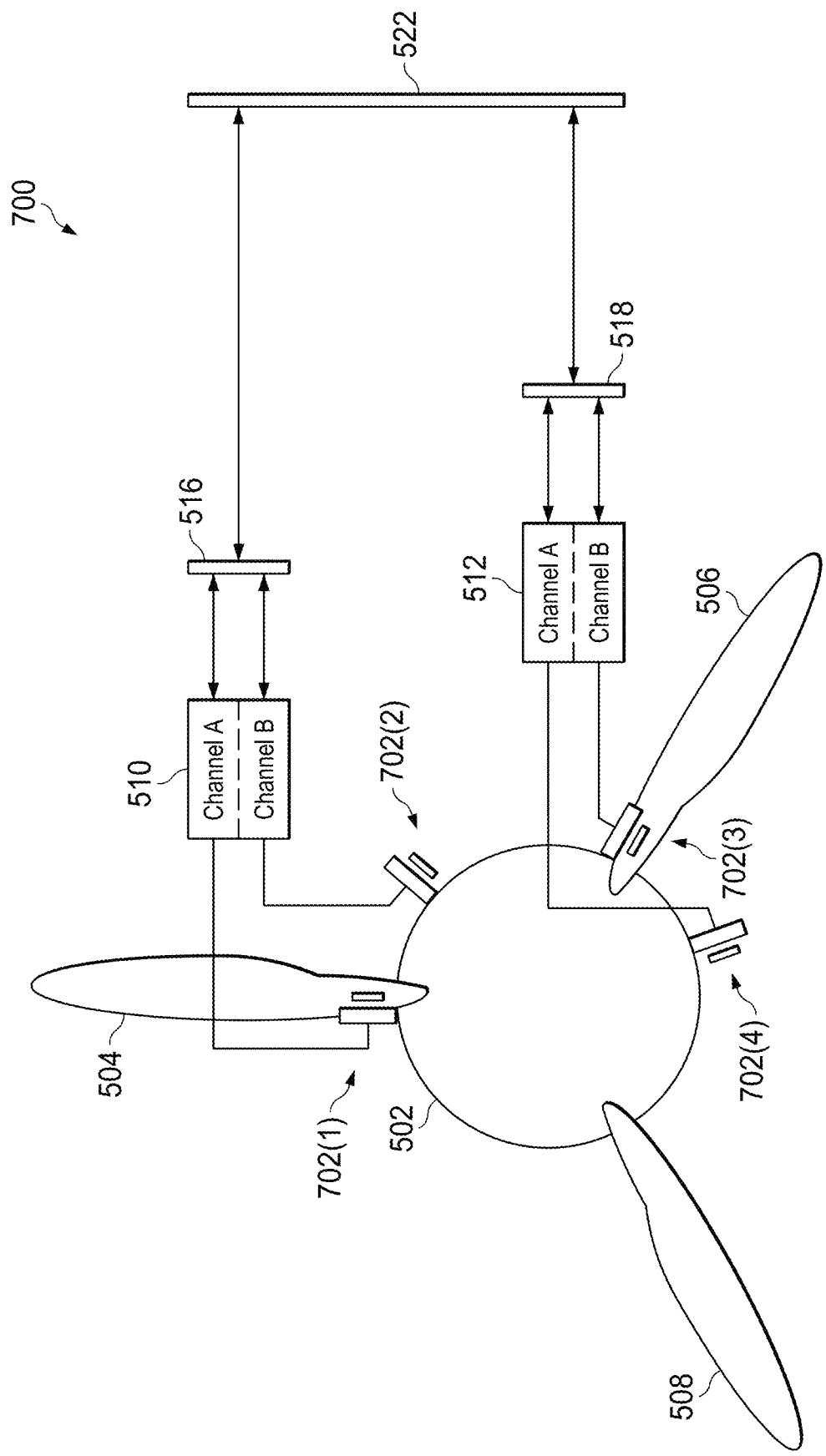
FIG. 7 illustrates a sensor system that utilizes multiple sensor arrangements.

FIG. 7 illustrates a sensor system that utilizes multiple sensor arrangements 702. A sensor system 700 includes the hub 502, the rotor blade 504, the rotor blade 506, and the rotor blade 508 extending from the hub 502. The hub 502 has four sensor arrangements 702(1), 702(2), 702(3), and 702(4) associated therewith, the sensor arrangement 702(1) and the sensor arrangement 702(3) being aligned azimuthally with the rotor blades 504 and 506, respectively, the sensor arrangement 702(2) and the sensor arrangement 702(4) being offset azimuthally from any of the rotor blades 504, 506, and 508. Each of the sensor arrangements 702(1)-(3) includes only a single magnet and a single AMR sensor. The sensor system 700 may be referred to as a dual duplex architecture.

Each of the AMR sensors is inter-operably coupled to a respective channel of a flight control computer ("FCC"), FCC 510 and FCC 512 being associated with the sensor arrangements 702(1), 702(2), 702(3), and 702(4), respectively, as indicated in FIG. 7. In other words, sensor arrangements 702(1), 702(2), 702(3), and 702(4) are associated with channel A of the FCC 510, channel B of the FCC 512, channel A of the FCC 512, and channel B of the FCC 512. Data buses 516 and 518 are each inter-operably coupled to a cross channel datalink ("CCDL") 522.

Each of the FCC 510 and 512 can identify erroneous sensing by one of its associated sensor arrangements 702 (1)-(4) by comparing flapping solutions across channels. In a typical embodiment, a mis-compare by one of the FCC 510 and the FCC 512 identifies a solution as invalid. In some embodiments, even if a mis-compare occurs, the sensor system 700 can continue to operate in spite of the mis-compare based on valid measurements of the remaining FCC.

Figure 8:
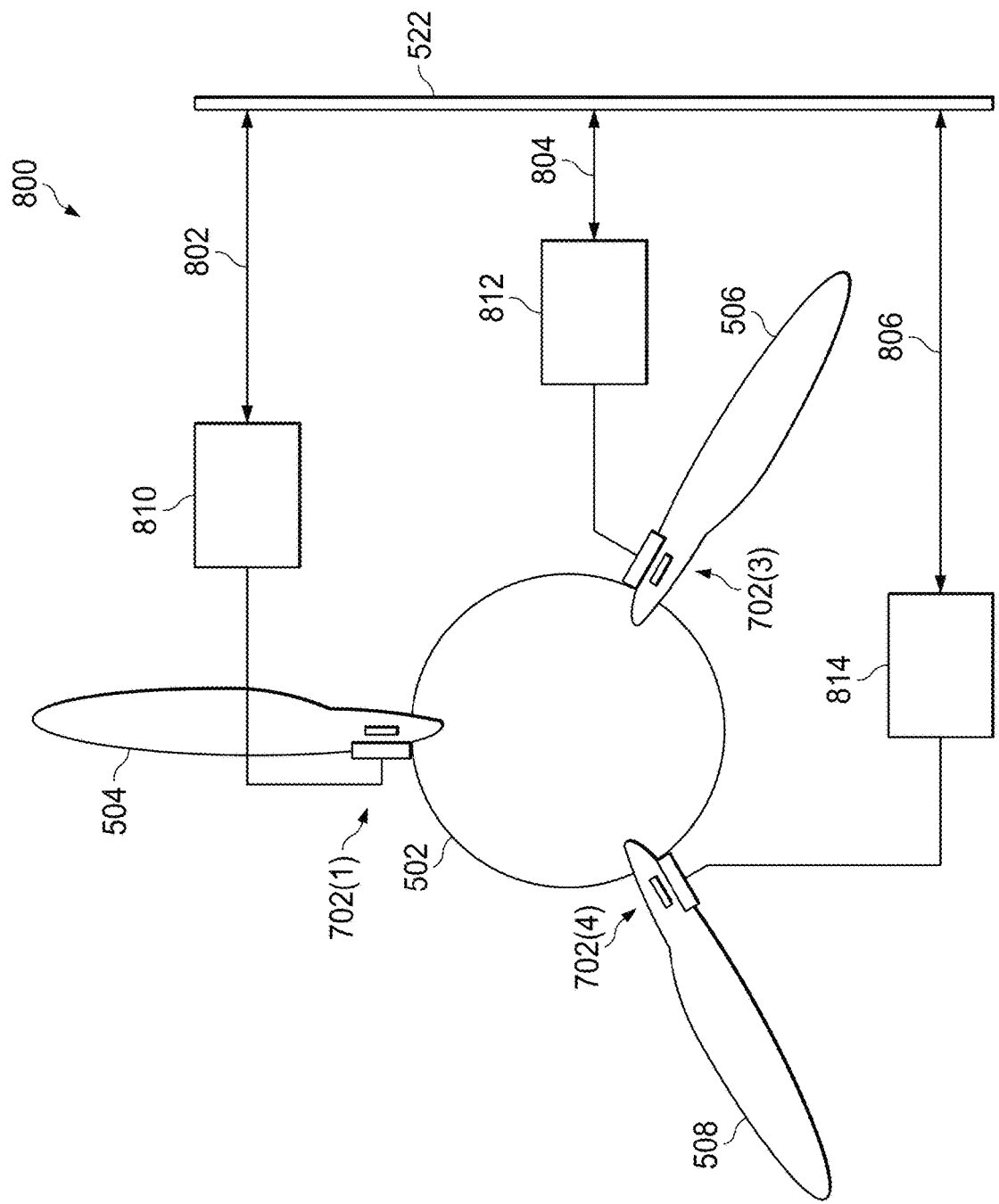
FIG. 8 illustrates a sensor system that utilizes multiple sensor arrangements.

FIG. 8 illustrates a sensor system that utilizes multiple sensor arrangements 702. A sensor system 800 includes the hub 502, the rotor blade 504, the rotor blade 506, and the rotor blade 508 extending from the hub 502. The hub 502 has three sensor arrangements 702(1), 702(2), and 702(4) associated therewith, each of which is aligned azimuthally with one of the rotor blades 504, 506, and 508, respectively. The sensor system 800 may be referred to as a single triplex architecture. As noted above, the sensor arrangements 702 (1), 702(2), and 702(4) need not necessarily be so aligned.

Each of the sensor arrangements 702(1), 702(2), and 70243) includes an AMR sensor and a magnet. Each of the AMR sensors is inter-operably coupled to a flight control computer ("FCC"), FCC 810, FCC 812, and FCC 814 being associated with sensor arrangements 702(1), 702(2), and 702(4), respectively. Each of the FCC 810, 812, and 814 is a single-channel FCC that is inter-operably coupled to a given AMR sensor and outputs a signal to respective data buses 802, 804, and 806. Data buses 802, 804, and 806 are each inter-operably coupled to cross channel datalink ("CCDL") 522. In a typical embodiment, the sensor system 800 can identify erroneous sensing by a process of comparing outputs of the sensor arrangements 702(1), 702(2), and 702(4) and applying a voting algorithm of flapping solutions among the FCC 810, FCC 812, and FCC 814. In another embodiment, the sensor arrangement 702(4) and the FCC 814 may be eliminated such that erroneous flapping is detected by comparing solutions between the FCC 810 and the FCC 812.

In addition to the capabilities of the architectures described relative to FIGS. 5-8, an additional layer of failure robustness can be achieved in the case all system FCCs have invalid measurements. For example, in the dual duplex embodiment of FIG. 5, if two channels of a given FCC have different sensor outputs, but the sensor system as a whole can determine that two sensors, each on a different FCC, yield an overall flapping solution that is in agreement, the agreed-upon flapping solution can be selected and utilized.

Those having skill in the art will appreciate that principles set forth herein can be applied to either teetering rotor hubs or gimballed rotor hubs. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of a controller as appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A rotor-hub flap-measurement system comprising:
   a rotor hub operable to flap relative to a main-rotor axis;
   a flap-linkage arm, a first end of the flap-linkage arm rotatably coupled to the rotor hub, the flap-linkage arm responsive to flapping of the rotor hub; and
   a magneto-resistive sensor system rotatably coupled to a second end of the flap-linkage arm and responsive to movement of the flap-linkage arm;
   wherein the magneto-resistive sensor system comprises:
   a first magneto-resistive sensor;
   a second magneto-resistive sensor; and
   a magnet having a first side and a second side, wherein the magnet is positioned between the first magneto-resistive sensor and the second magneto-resistive sensor such that the first side of the magnet is directly adjacent the first magneto-resistive sensor and the second side of the magnet is directly adjacent the second magneto-resistive sensor.

2. The rotor-hub flap-measurement system of claim 1, wherein the rotor-hub flap-measurement system is aligned azimuthally with a rotor blade associated with the rotor hub.

3. The rotor-hub flap-measurement system of claim 1, wherein the magneto-resistive sensor system comprises at least one anisotropic magneto-resistive sensor.

4. The rotor-hub flap-measurement system of claim 1, comprising a platform to which the magneto-resistive sensor system is mounted.

5. The rotor-hub flap-measurement system of claim 4, wherein the platform is integrated into a spinner-spoke mount.

6. The rotor-hub flap-measurement system of claim 1, wherein the flap-linkage arm is rotatably coupled to the magneto-resistive sensor system via a spherical bearing.

7. The rotor-hub flap-measurement system of claim 1, wherein the flap-linkage arm is rotatably coupled to the rotor hub via a spherical bearing.

8. The rotor-hub flap-measurement system of claim 1, wherein the magneto-resistive sensor system comprises:
 a rotatable sensor arm rotatably coupled to the flap-linkage arm and coupled to one of the magnet, the first magneto-resistive sensor, and the second magneto-resistive sensor.

9. The rotor-hub flap-measurement system of claim 8, wherein the first and second magneto-resistive sensors are anisotropic magneto-resistive sensors.

10. The rotor-hub flap-measurement system of claim 8, wherein the magnet is rotatable responsive to rotation of the rotatable sensor arm.

11. The rotor-hub flap-measurement system of claim 8, wherein the first and second magneto-resistive sensors are rotatable responsive to rotation of the rotatable sensor arm.

12. The rotor-hub flap-measurement system of claim 8, comprising:
 a mounting bracket to which one of the magnet, the first magneto-resistive sensor, and the second magneto-resistive sensor is mounted; and
 a bearing having a rotational axis about which the rotatable sensor arm rotates.

13. A rotor-hub flap-measurement method comprising:
 flapping, by a rotor hub, relative to a main-rotor axis;
 responsive to the flapping, a first end of a flap-linkage arm rotatably coupled to the rotor hub moving, at least in part, parallel to the main-rotor axis; and
 responsive to the moving by the flap-linkage arm, a magneto-resistive sensor system rotatably coupled to a second end of the flap-linkage arm sensing movement of the flap-linkage arm;
 wherein the magneto-resistive sensor system comprises:
  a first magneto-resistive sensor;
  a second magneto-resistive sensor; and
  a magnet having a first side and a second side, wherein the magnet is positioned between the first magneto-resistive sensor and the second magneto-resistive sensor such that the first side of the magnet is directly adjacent the first magneto-resistive sensor and the second side of the magnet is directly adjacent the second magneto-resistive sensor.

14. The rotor-hub flap-measurement method of claim 13, wherein the flap-linkage arm is aligned azimuthally with a rotor blade associated with the rotor hub.

15. The rotor-hub flap-measurement method of claim 13, wherein the magneto-resistive sensor system comprises at least one anisotropic magneto-resistive sensor.

16. The rotor-hub flap-measurement method of claim 13, wherein the flap-linkage arm is rotatably coupled to the magneto-resistive sensor system via a spherical bearing.

17. The rotor-hub flap-measurement method of claim 13, wherein the flap-linkage arm is rotatably coupled to the rotor hub via a spherical bearing.

18. The rotor-hub flap-measurement method of claim 13, wherein the sensing by the magneto-resistive sensor system comprises sensing relative movement between the magnet of the magneto-resistive sensor system and the first and second magneto-resistive sensors of the magneto-resistive sensor system.

19. The rotor-hub flap-measurement method of claim 18, wherein the first and second magneto-resistive sensors are anisotropic magneto-resistive sensors.

20. The rotor-hub flap-measurement method of claim 18, wherein one of the magnet, the first magneto-resistive sensor, and the second magneto-resistive sensor is rotatable responsive to movement of the flap-linkage arm.

* * * * *